(12) United States Patent
Theisinger (10) Patent No.: US 10,663,713 B2
(45) Date of Patent: May 26, 2020

(54) OPTICAL INSTRUMENT

(71) Applicant: SUPAS LTD, Hong Kong (CN)

(72) Inventor: Hermann Theisinger, Vienna (AT)

(73) Assignee: SUPAS Ltd. (MY)

( * ) Notice: Subject to any disclaimer, the term of this patent is extended or adjusted under 35 U.S.C. 154(b) by 35 days.

(21) Appl. No.: 16/006,725

(22) Filed: Jun. 12, 2018

(65) Prior Publication Data

US 2018/0356626 A1 Dec. 13, 2018

Related U.S. Application Data (60) Provisional application No. 62/519,105, filed on Jun. 13, 2017.

(51) Int. Cl.
| | |
|---|---|
| *F41G 1/38* | (2006.01) |
| *G02B 23/00* | (2006.01) |
| *G02B 23/16* | (2006.01) |
| *G02B 27/32* | (2006.01) |

(52) U.S. Cl.
CPC ............ *G02B 23/145* (2013.01); *F41G 1/38* (2013.01); *G02B 23/16* (2013.01); *G02B 27/32* (2013.01)

(58) Field of Classification Search
CPC ......... F41G 1/38; G02B 23/145; G02B 23/16; G02B 27/32; G02B 23/00
See application file for complete search history.

(56) References Cited

U.S. PATENT DOCUMENTS

| | | | | |
|---|---|---|---|---|
| 3,782,822 A | * | 1/1974 | Spence | G02B 23/145 356/21 |
| 3,918,791 A | * | 11/1975 | Perry | G02B 7/10 359/422 |
| 7,684,114 B2 | * | 3/2010 | Thomas | F41G 1/38 359/421 |
| 7,944,611 B1 | * | 5/2011 | Regan | F41G 1/38 359/422 |
| 8,705,173 B2 | * | 4/2014 | Peters | G02B 23/10 359/428 |

(Continued)

FOREIGN PATENT DOCUMENTS

| | | |
|---|---|---|
| AU | 2015336880 B2 | 5/2017 |
| BR | 112017008272 A2 | 6/2018 |
| CA | 2957447 A1 | 4/2016 |

(Continued)

*Primary Examiner* — William R Alexander
*Assistant Examiner* — Balram T Parbadia
(74) *Attorney, Agent, or Firm* — Ian Burns; ATIP Law (57) ABSTRACT

An optical instrument, such as a riflescope, is disclosed having variable magnification. The reticle can include a stationary display element, such as a magnification scale displayed on a perimeter of the field of view. A moving display element, such as a scale indicator, may be coupled to an actuator that is used to change the magnification power. Both the moving display element and stationary display element may be visible in a field of view through the ocular and together can be used to indicate the magnification power, or a related parameter, such as the range or distance to a target. As the actuator is used to change the magnification power, the user can see the magnification adjustment in the field of view. Thus, the user does not need to look away from the field of view of the instrument to know the magnification setting.

16 Claims, 7 Drawing Sheets

(56) References Cited

U.S. PATENT DOCUMENTS 9,291,810 B1 3/2016 Ross
2016/0061566 A1 3/2016 Chen

FOREIGN PATENT DOCUMENTS

| CA | 2957447 C | 11/2018 |
| CN | 101122675 A | 2/2008 |
| CN | 101769700 A | 7/2010 |
| EP | 3210067 A1 | 8/2017 |
| EP | 3210067 A4 | 6/2018 |
| RU | 2148775 C1 | 5/2000 |
| UA | 2015336880 A1 | 2/2017 |
| WO | WO 2016061659 A1 | 4/2016 |

* cited by examiner

OPTICAL INSTRUMENT

CROSS REFERENCE TO RELATED APPLICATIONS

This application claims priority to U.S. provisional patent application Ser. No. 62/519,105, filed Jun. 13, 2017, the entire contents of which are herein incorporated by reference.

FIELD OF THE INVENTION

The present invention relates to operational elements of a telescopic optical instrument providing variable magnification and therewith coupled or affiliated indicator elements for optical instruments. The invention relates particularly, though not exclusively, for firearm scopes and spotting scopes.

BACKGROUND

Telescopic optical instruments commonly feature an actuator which is coupled to an erector system comprising lenses, a guide tube and a cam tube. By rotation of the cam tube inside the guide tube, the lenses are moved relative to each other thus increasing or decreasing the target image in magnification. By result, the user is able to see the target larger or smaller, but without any indication of selected power setting inside the field-of-view. The selected power setting is commonly indicated on an exterior portion of the actuator by means of magnification numbers. The user consequently must interrupt watching the target image and observe the actuators numbers while dialing-in a desired magnification factor. This becomes an even more critical disadvantage with optical instruments that combine the power changing function with other functions. Such other functions may be of opto-mechanical nature, for example, auto-compensation systems that feature reticles that are off-set from the optical axis. Other functions may be of electrical nature, for example, automatic switching on or off illumination systems for reticles when reaching a particular power setting. Consequently, some indication of the selected power setting and/or a resulting auto-compensation distance or similar power-setting dependent parameter inside the field-of-view is desired. Similar problems exist with non-firearm scopes, such as observation optics, spotting scopes and the like.

What is required is a system and method for making the selected power setting and related information visible to the user inside the field-of-view.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to provide information on the power setting to the user of a telescopic optical instrument inside the field-of-view;

to provide the information in a single image plane;

the ability to provide the information only in the second image plane of a telescopic optical instrument;

and, in an alternative embodiment, to translate the power setting into subsequent information, such as distance.

These and other advantages may be realized by reference to the remaining portions of the specification, claims, and abstract.

Brief Description of One Embodiment of the Present Invention

In one aspect of the present invention, there is provided a telescopic optical instrument that, by means of a power changing mechanism, changes the magnification of the target image. The movement of one or more mechanical elements related to the power changing mechanism is used to move a coupled or affiliated moving display element. The moving display element is at least partially visible inside a field-of-view of the instrument so that the observer is able to see its movement while zooming. The moving display element may be one or more indicator elements, a scale representing a plurality of parameter values or the like. One or more stationary display elements, which may be a scale representing a plurality of parameter values, one or more indicator elements, or the like, may be provided inside the field-of-view. Movement of the power changing mechanism may cause relative movement between the moving and stationary display elements to cause a change in a parameter value indicated by one or more of the indicator elements, thereby linking the indicated parameter value to the power setting.

The scale may comprise numeric, alphabetic or symbolic characters that represent parameters values including, without limitation, the selected power setting, corresponding auto-compensation distances or illumination on/off information.

In one embodiment, the moving display element comprises at least one indicator element and the stationary display element comprises at least one scale representing parameter values.

In one embodiment, the stationary display element comprises at least one indicator element and the moving display element comprises at least one scale representing parameter values.

In one aspect, there is provided a telescopic optical instrument providing variable magnification. The instrument may comprise a housing and an actuator for power selection, the actuator being rotatable relative to the housing. An objective lens comprising one or more objective lens elements within the housing may define a first focal plane. An erector system may comprise one or more erector lens elements within the housing, at least one guide tube and at least one cam tube, the at least one cam tube being mechanically coupled to the actuator by a coupling element. An ocular lens comprising one or more ocular lens elements may define a second focal plane within the housing, the ocular lens providing a field of view, the field of view having a center and a perimeter. A reticle may be positioned coplanar with the second focal plane inside the at least one guide tube, the reticle comprising one or more reticle marks and at least one stationary display element. A moving display element may be mechanically connected to the coupling element, the moving display element being positioned inside the field of view. Actuation of the actuator ring may cause a) a change in the magnification of the instrument; and b) relative movement between the at least one stationary display element and the at least one moving display element to cause a change in an indication of a parameter value by at least one of the at least one stationary display element and the at least one moving display element.

In one aspect, there is provided a telescopic optical instrument comprising housing means, actuator means rotatable around the housing means for power selection, objective lens means defining a first focal plane, erector means comprising at least one guide tube and at least one cam tube, the cam tube being mechanically coupled to the actuator means by a coupling means, ocular lens means defining a second focal plane and a field of view, reticle means positioned coplanar with the second focal plane inside the at least one guide tube, the reticle means comprising reticle marking means and stationary display means, and moving display means mechanically connected to the coupling element, the moving display means being positioned inside the field of view. Actuation of the actuator means causes a) a change in the magnification of the instrument; and b) relative movement between the stationary display means and the moving display means to cause a change in an indication of a parameter value by at least one of the stationary display means and the moving display means.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
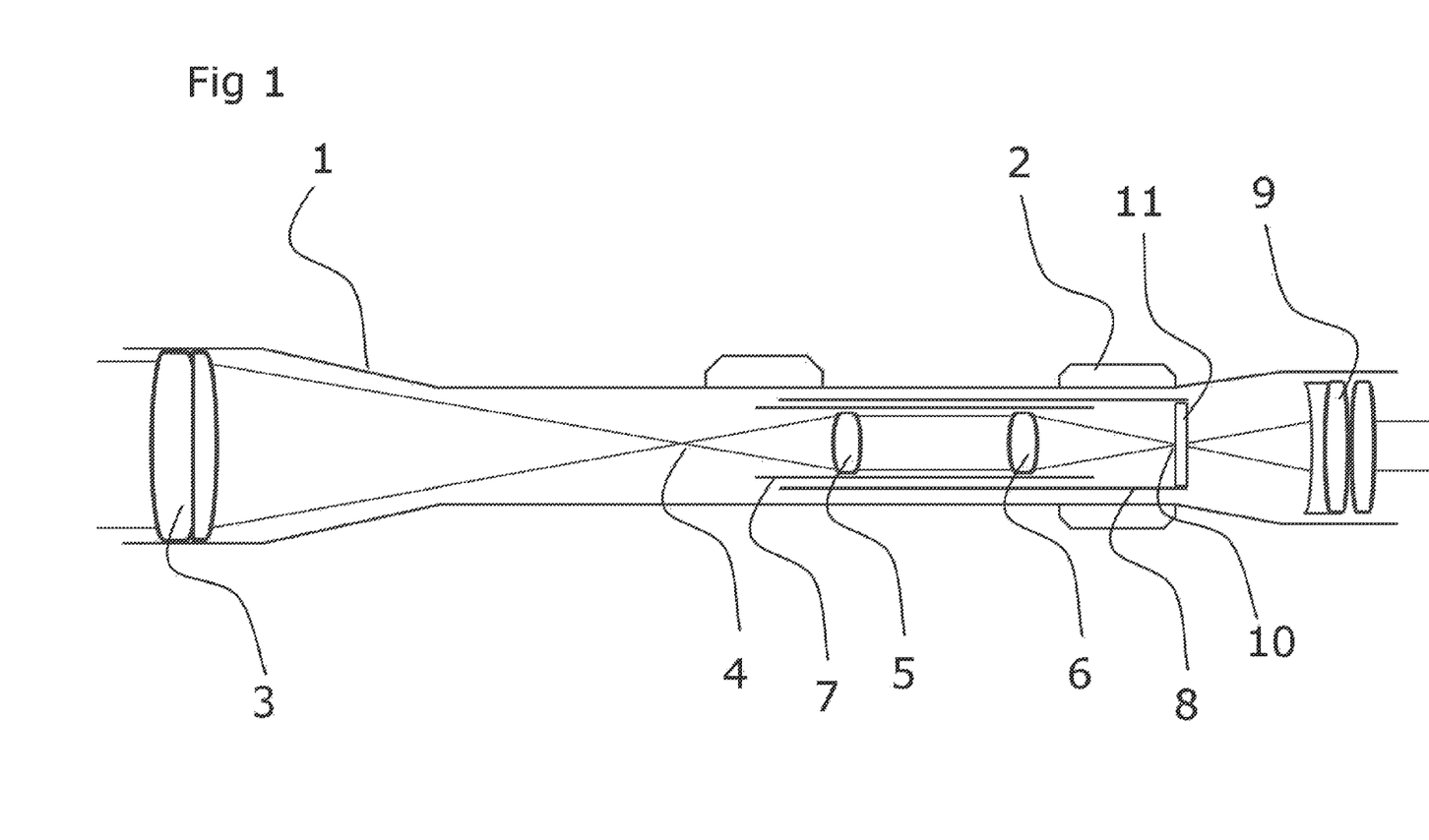
FIG. 1 substantially shows a schematic drawing of a telescopic firearms sight.

In FIG. 1, there is shown a telescopic optical instrument such as a scope for a firearm. Typically, the scope includes a housing 1, an actuator 2 being rotatable around the housing 1, an objective lens 3 having a first focal plane 4. Furthermore the scope for a firearm typically includes at least two erector lenses 5 and 6, that are held by a cam tube 7 inside a guide tube 8. The front of the scope is considered to be the objective end, i.e. the end closest to the object. The rear of the scope is considered to be the ocular end. Light typically enters the objective end and follows a light path(s) through the scope to the ocular end. The light is modified by the various optical elements along the light path to produce an image to the observer at the ocular end. By rotation of the actuator 2 the coupled cam tube 7 is rotated inside the guide tube 8 thus changing the distance between the erector lenses 5 and 6, which creates a magnification change. Behind the erector lens 6 an ocular 9 comprising of one or more lenses with a second focal plane 10 is located. In the focal plane 10, and mounted onto the rear end of the guide tube 8, a reticle 11 is positioned to become visible inside the field of view.

Figure 2:
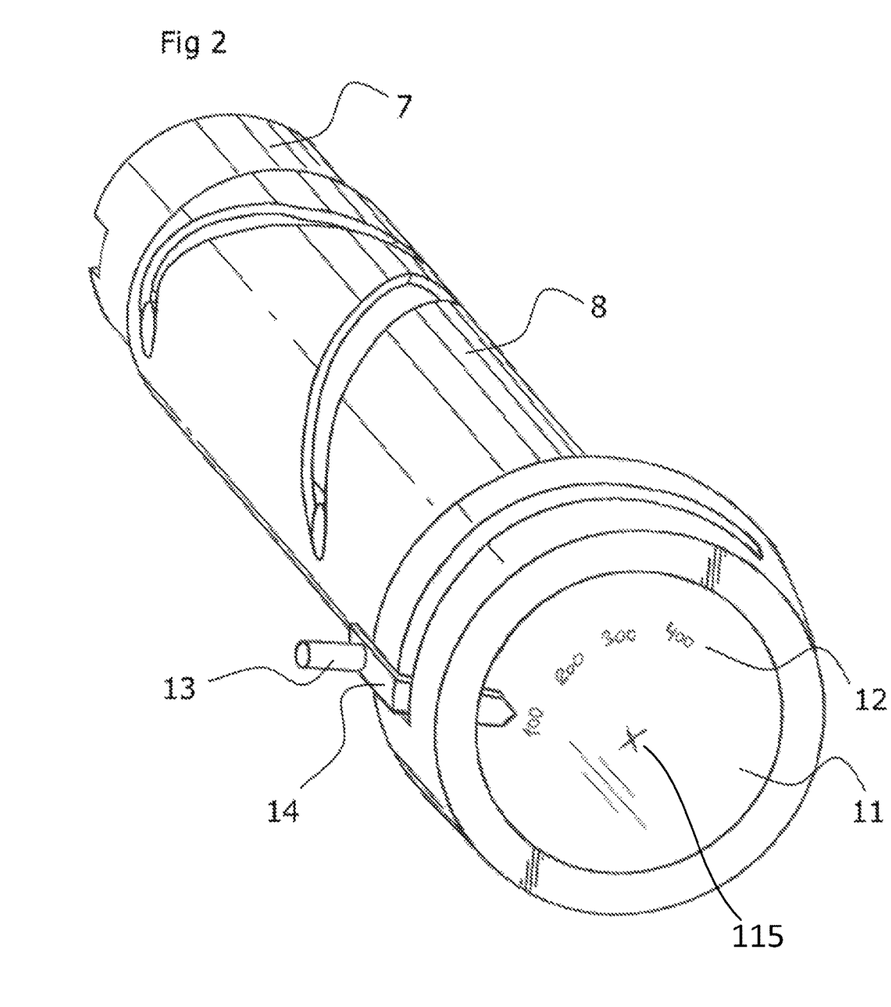
FIG. 2 substantially shows an embodiment of the sight in a minimum power magnification position.

FIG. 2 shows the cam tube 7 and the guide tube 8 with the reticle 11 mounted at the rear end. The reticle 11 includes one or more aiming or sighting marks 115. The reticle marks 115 can include any of the many known types of reticle marks including, without limitations, crosshairs, circles, etc. Typically, the reticle marks 115 will be centered on or substantially symmetric about the center of the field of view. In addition to the reticle marks 115, the reticle 11 is also carrying a stationary scale 12 that is visible in the field of view through the ocular lens. The rotatable cam tube 7 features a raised element that, by means of a coupling element 13, connects to the actuator 2 as shown in FIG. 1. By turning the actuator 2 and the connected coupling element 13, the cam tube 7 is consequently rotated inside the guide tube 8 thus changing the distance between the erector lenses 5 and 6, as shown in FIG. 1, which results in a magnification change. The coupling element 13 is connected to a rotatable indicator element 14. This rotatable indicator element 14 has a first portion that extends from the coupling element 13 and is folded in a 90 degree angle to a second portion such that its rear end becomes visible inside the field of view. In FIG. 2 the entire embodiment is shown in a minimum power setting position.

Figure 3:
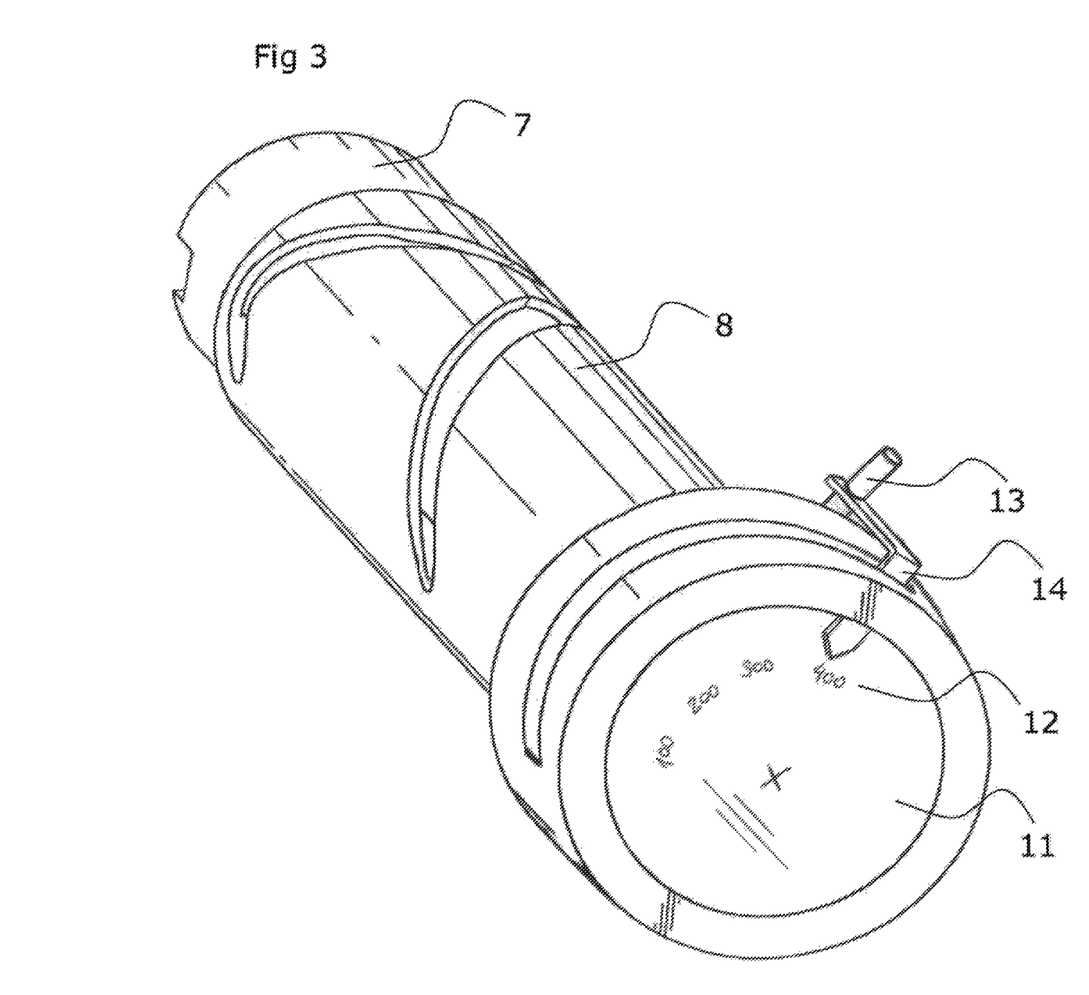
FIG. 3 substantially shows the sight of FIG. 2 in a maximum power magnification position.

FIG. 3 shows the same embodiment with cam tube 7, guide tube 8, reticle 11, stationary scale 12, coupling element 13 and rotatable indicator element 14, but in a maximum power setting in order to illustrate the relative movement of the rotatable indicator element 14 against the stationary scale 12.

Figure 4:
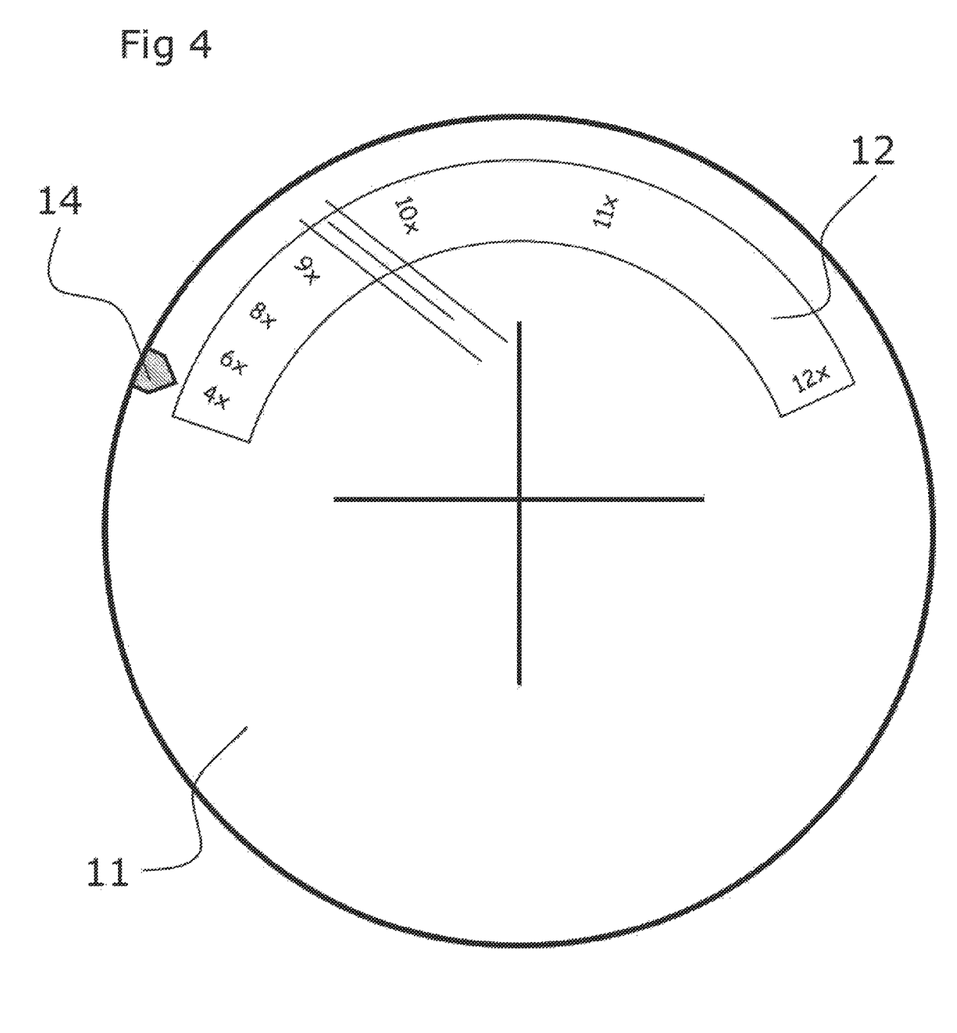
FIG. 4 substantially shows a target image or field of view of a sight with indicated power setting by means of a stationary scale and a rotating indicator element as visible to the observer in minimum power magnification position.
Figure 5:
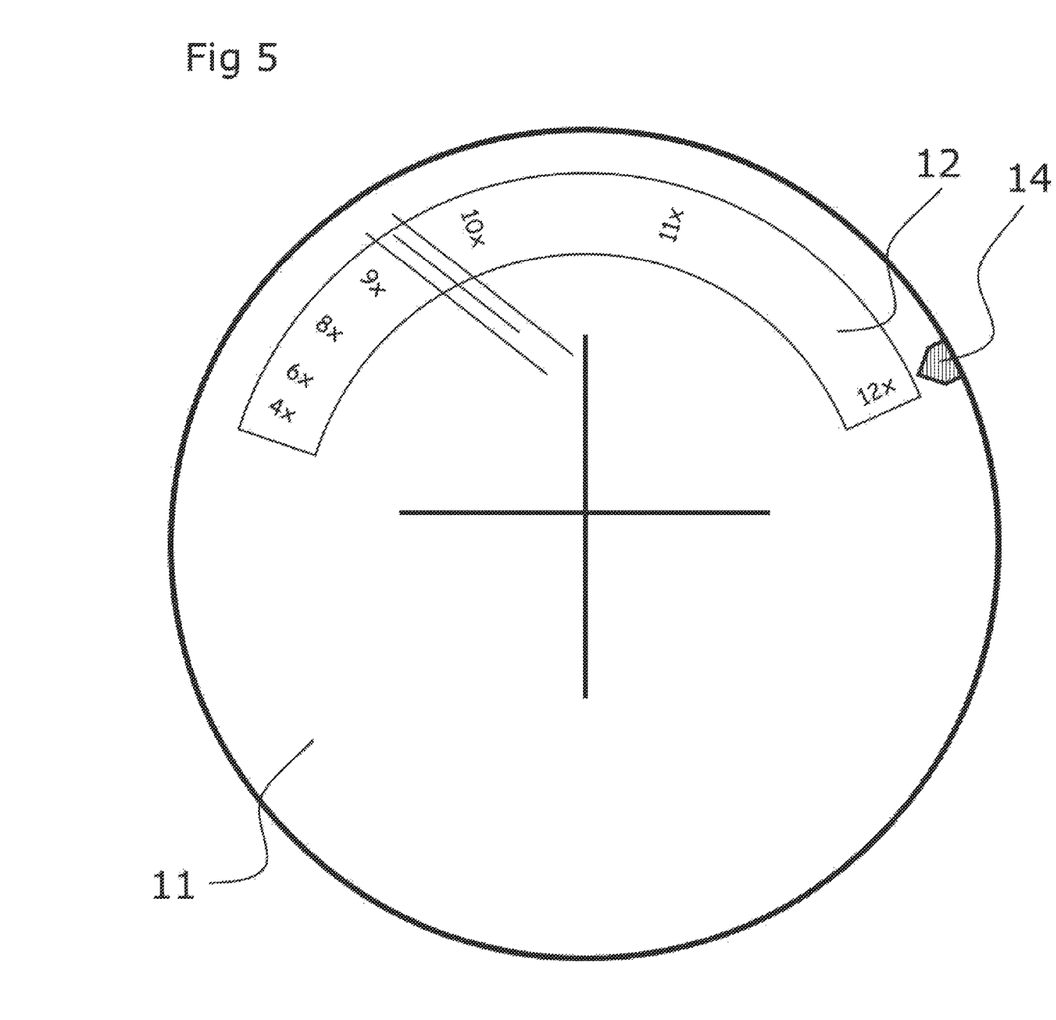
FIG. 5 substantially shows the target image of FIG. 4 with indicated power setting by means of a stationary scale and a rotating indicator element as visible to the observer in maximum power magnification position.
Figure 6:
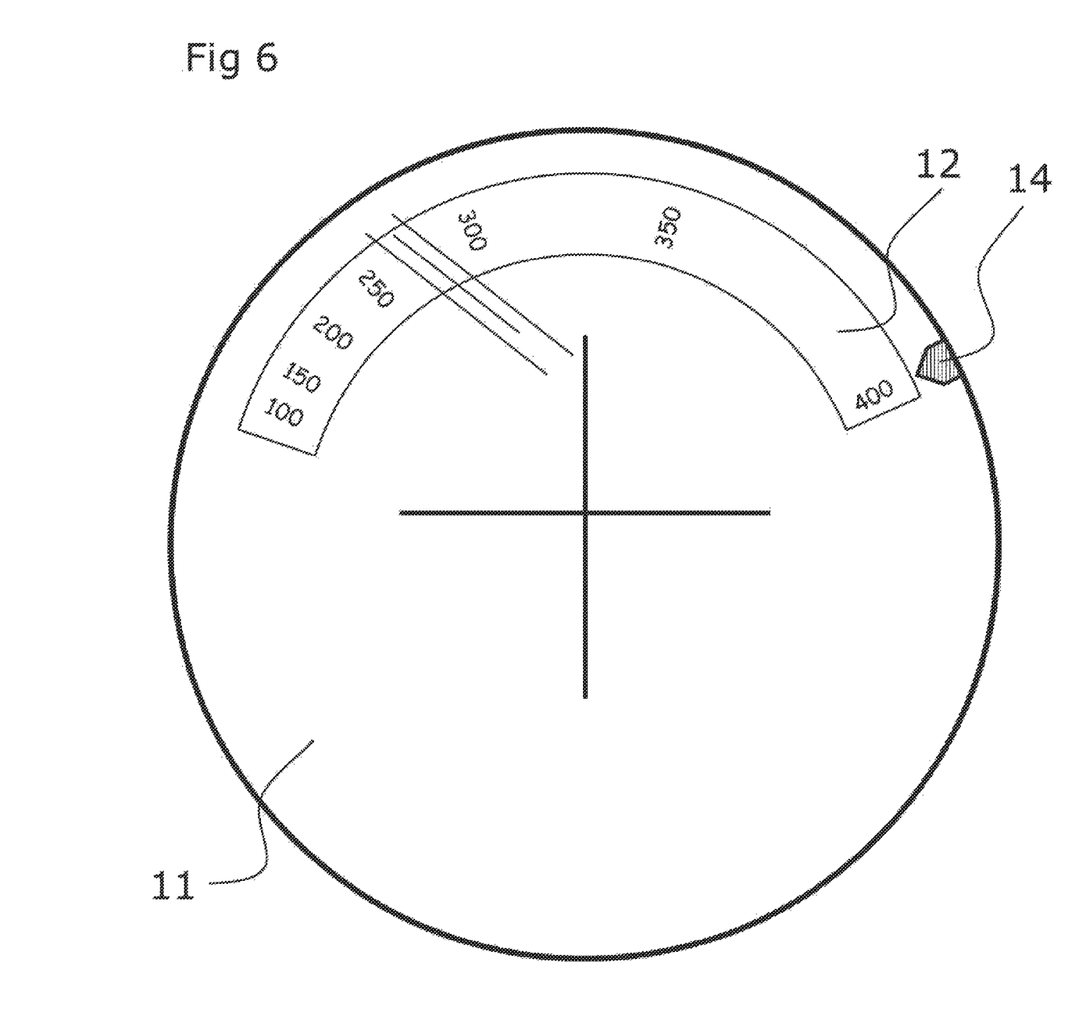
FIG. 6 substantially shows a target image with indicated subsequent information resulting from the power setting by means of a stationary scale and a rotating indicator element as visible to the observer in maximum power magnification position.

FIG. 4 shows a target image with indicated power setting by means of a stationary scale 12 located on the reticle 11 and a rotatable indicator element 14 as visible to the observer in minimum power setting position;

FIG. 5 shows a target image with indicated power setting by means of a stationary scale 12 located on the reticle 11 and a rotatable indicator element 14 as visible to the observer in maximum power setting position;

FIG. 6 shows a target image with indicated subsequent information resulting from the power setting by means of a stationary scale 12 located on the reticle 11 and a rotatable indicator element 13 as visible to the observer in maximum power setting position. The FIG. 6 shows an example of a translation of the maximum power setting into distance information, such as yards or meters, which provides the user an indication of the range of the target. Magnification and range may both be displayed to the user.

Figure 7:
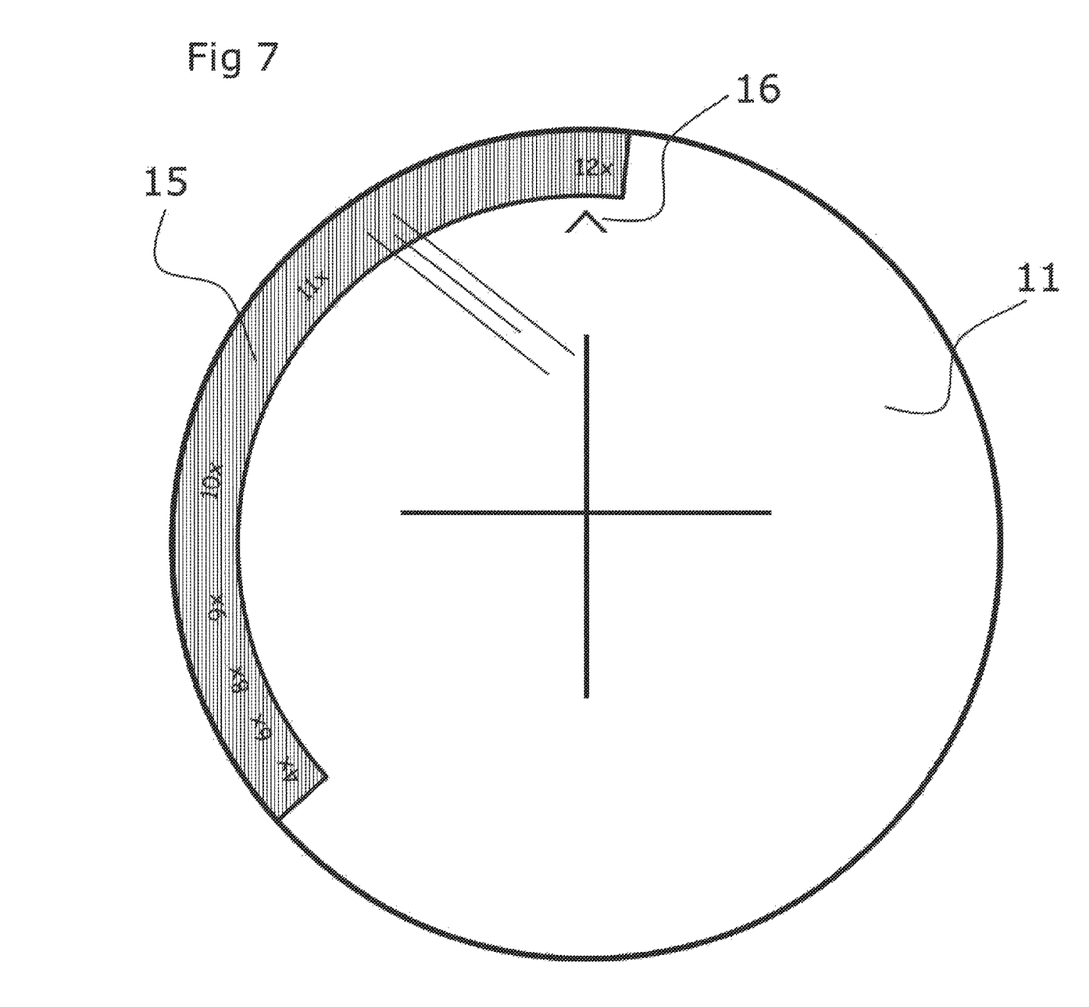
FIG. 7 substantially shows a target image with indicated power setting by means of a rotating scale and a stationary indicator element as visible to the observer in maximum power magnification position.

FIG. 7 shows a target image with indicated power setting by means of a rotatable scale element 15 and a stationary indicator mark 16 located on the reticle 11 as visible to the observer in maximum power magnification position. Any change in power setting results in a rotation of the scale element 15 against a stationary indicator mark 16 thus indicating the selected power setting.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A telescopic optical instrument providing variable magnification comprising:
   (A) a housing;
   (B) an actuator for power selection, the actuator being rotatable relative to the housing;
   (C) an objective lens comprising one or more objective lens elements within the housing, the objective lens defining a first focal plane;
   (D) an erector system comprising one or more erector lens elements within the housing, at least one guide tube and at least one cam tube, the at least one cam tube being coupled to the actuator by a coupling element;
   (E) an ocular lens comprising one or more ocular lens elements, the ocular lens defining a second focal plane within the housing, the ocular lens providing a field of view, the field of view having a center and a perimeter;
   (F) a reticle positioned coplanar with the second focal plane inside the at least one guide tube, the reticle comprising one or more reticle marks and at least one stationary display element; and
   (G) a moving display element connected to the coupling element, the moving display element being positioned inside the field of view;
   wherein actuation of the actuator causes:
     a) a change in the magnification of the instrument; and
     b) relative movement between the at least one stationary display element and the at least one moving display element to cause a change in an indication of a parameter value by at least one of the at least one stationary display element and the at least one moving display element.

2. The telescopic optical instrument of claim 1 wherein the stationary display element comprises a scale with a plurality of scale markings representing a plurality of parameter values positioned substantially adjacent the perimeter of the field of view and wherein the moving display element comprises an indicator element configured to indicate at least one of the plurality of parameter values dependent on a position of the actuator.

3. The telescopic optical instrument of claim 1 wherein the moving display element comprises a scale with a plurality of scale markings representing a plurality of parameter values positioned substantially adjacent the perimeter of the field of view and wherein the stationary display element comprises one or more indicator elements configured to indicate at least one of the plurality of parameter values dependent on a position of the actuator.

4. The telescopic optical instrument of claim 1 wherein the parameter values comprise magnification values.

5. The telescopic optical instrument of claim 1 wherein the parameter values comprise magnification dependent distance information.

6. The telescopic optical instrument of claim 1 wherein the erector system comprises two or more positive lens elements.

7. The telescopic optical instrument of claim 1 wherein the actuator comprises an actuator ring mounted around the housing.

8. The telescopic optical instrument of claim 1 wherein the moving display element comprises a first portion extending from the coupling element and a second portion extending from the first portion into the field of view.

9. A telescopic optical instrument comprising:
   (A) housing means;
   (B) actuator means rotatable around the housing means for power selection;
   (C) objective lens means defining a first focal plane;
   (D) erector means comprising at least one guide tube and at least one cam tube, the cam tube being mechanically coupled to the actuator means by a coupling means;
   (E) ocular lens means defining a second focal plane and a field of view;
   (F) reticle means positioned coplanar with the second focal plane inside the at least one guide tube, the reticle means comprising reticle marking means and stationary display means; and
   (G) moving display means mechanically connected to the coupling element, the moving display means being positioned inside the field of view;
   wherein actuation of the actuator means causes:
     (a) a change in the magnification of the instrument; and
     (b) relative movement between the stationary display means and the moving display means to cause a change in an indication of a parameter value by at least one of the stationary display means and the moving display means.

10. The telescopic optical instrument of claim 9 wherein the stationary display means comprises scale means representing a plurality of parameter values positioned substantially adjacent the perimeter of the field of view and wherein the moving display means comprises an indicator means configured to indicate at least one of the plurality of parameter values dependent on a position of the actuator means.

11. The telescopic optical instrument of claim 9 wherein the moving display means comprises a scale means representing a plurality of parameter values positioned substantially adjacent the perimeter of the field of view and wherein the stationary display means comprises indicator means configured to indicate at least one of the plurality of parameter values dependent on a position of the actuator means.

12. The telescopic optical instrument of claim 9 wherein the parameter values comprise magnification values.

13. The telescopic optical instrument of claim 9 wherein the parameter values comprise magnification dependent distance information.

14. The telescopic optical instrument of claim 9 wherein the erector means comprises two or more positive lens elements.

15. The telescopic optical instrument of claim 9 wherein the actuator means comprises an actuator ring mounted around the housing means.

16. The telescopic optical instrument of claim 9 wherein the moving display means comprises a first portion extending from the coupling means and a second portion extending from the first portion into the field of view.

* * * * *